United States Patent
Yamamoto

(10) Patent No.: US 7,860,310 B2
(45) Date of Patent: Dec. 28, 2010

(54) IMAGE PROCESSING APPARATUS AND METHOD, COMPUTER PROGRAM, AND STORAGE MEDIUM

(75) Inventor: Noriyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 11/677,881

(22) Filed: Feb. 22, 2007

(65) Prior Publication Data
US 2007/0196014 A1  Aug. 23, 2007

(30) Foreign Application Priority Data
Feb. 23, 2006 (JP) .............................. 2006-046887

(51) Int. Cl.
*G06K 9/34* (2006.01)
(52) U.S. Cl. .................. 382/173; 382/169; 358/464; 358/462
(58) Field of Classification Search .................. 382/169, 382/168, 284; 358/464, 462
See application file for complete search history.

(56) References Cited

U.S. PATENT DOCUMENTS

| | | | | |
|---|---|---|---|---|
| 5,475,507 A * | 12/1995 | Suzuki et al. | ............... | 358/500 |
| 5,630,037 A * | 5/1997 | Schindler | ................... | 345/592 |
| 5,706,368 A * | 1/1998 | Mita | ........................... | 382/284 |
| 6,993,271 B2 * | 1/2006 | Sakabe | ........................ | 399/182 |
| 7,251,357 B2 * | 7/2007 | Takemoto | .................... | 382/162 |
| 7,283,683 B1 * | 10/2007 | Nakamura et al. | ........... | 382/274 |
| 2002/0140981 A1 * | 10/2002 | Takemoto | .................. | 358/1.18 |
| 2004/0184836 A1 * | 9/2004 | Sakabe | ........................ | 399/182 |
| 2007/0200938 A1 * | 8/2007 | Kaku et al. | .................. | 348/239 |
| 2008/0058593 A1 * | 3/2008 | Gu et al. | ...................... | 600/109 |
| 2009/0274363 A1 * | 11/2009 | Dai | ........................... | 382/164 |

FOREIGN PATENT DOCUMENTS

| | | | |
|---|---|---|---|
| JP | 11-150657 A | | 6/1999 |
| JP | 2003153002 A | * | 5/2003 |
| JP | 2004-349858 A | | 12/2004 |
| JP | 2005-101763 A | | 4/2005 |
| JP | 2005101763 A | * | 4/2005 |

* cited by examiner

*Primary Examiner*—Brian Q Le
*Assistant Examiner*—Mekonen Bekele
(74) *Attorney, Agent, or Firm*—Canon U.S.A., Inc. I.P. Division

(57) ABSTRACT

In a method for detecting a background-color level in accordance with a selected region, if the selected region does not contain a large amount of background color, the background-color level cannot be detected accurately. Thus, an image signal of a region read by an image reader is input, a part of the read region is selected, a background-color region is detected in accordance with the image signal of the input read region and an image signal of the selected region, and a background color contained in the selected region is removed in accordance with the level of an image signal of the detected background-color region.

10 Claims, 19 Drawing Sheets

| # | BACKGROUND-COLOR CANDIDATES | PROPORTION RATIO | SCORE |
|---|---|---|---|
| 1 | SQUARE 504 | 35% | 1 |
| 2 | BACKGROUND COLOR 503 | 30% | 2 |
| 3 | CIRCLE 307 | 25% | 3 |
| 4 | TRIANGLE 308 | 10% | 4 |

FIG. 15

| # | BACKGROUND-COLOR CANDIDATES | PROPORTION RATIO | SCORE |
|---|---|---|---|
| 1 | OUTSIDE ORIGINAL 310 | 30% | 2 |
| 2 | BACKGROUND COLOR 305 | 34% | 1 |
| 3 | SQUARE 306 | 18% | 3 |
| 4 | CIRCLE 307 | 13% | 4 |
| 5 | TRIANGLE 308 | 5% | 5 |

FIG. 16

| # | BACKGROUND-COLOR CANDIDATES | SCORE | | TOTAL SCORE | RESULTS |
|---|---|---|---|---|---|
| | | SELECTED REGION (902) | ENTIRE REGION (903) | (904) | |
| 1 | SQUARE 306 | 1 | 3 | 4 | |
| 2 | BACKGROUND COLOR 305 | 2 | 1 | 3 | DETERMINED TO BE BACKGROUND COLOR |
| 3 | CIRCLE 307 | 3 | 4 | 7 | |
| 4 | TRIANGLE 308 | 4 | 5 | 9 | |
| 5 | OUTSIDE OF ORIGINAL 310 | – | 2 | – | |

FIG. 17

| # | BACKGROUND-COLOR CANDIDATES | SCORE | | TOTAL SCORE | RESULTS |
|---|---|---|---|---|---|
| | | SELECTED REGION | ENTIRE REGION | | |
| 1 | SQUARE 1306 | 1 | 3 | 4 | DETERMINED TO BE BACKGROUND COLOR WHEN SELECTED REGION HAS PRIORITY |
| 2 | BACKGROUND COLOR 1313 | 2 | 2 | 4 | DETERMINED TO BE BACKGROUND COLOR WHEN ENTIRE REGION HAS PRIORITY |
| 3 | CIRCLE 1307 | 3 | 4 | 7 | |
| 4 | TRIANGLE 1308 | 4 | 5 | 9 | |
| 5 | OUTSIDE OF ORIGINAL 1310 | - | 1 | - | |

| # | BACKGROUND-COLOR CANDIDATES | SCORE | | TOTAL SCORE | RESULTS |
|---|---|---|---|---|---|
| | | SELECTED REGION | ENTIRE REGION | | |
| 1 | SQUARE 1306 | 3 | 3 | 6 | |
| 2 | BACKGROUND COLOR 1313 | 1 | 2 | 3 | DETERMINED TO BE BACKGROUND COLOR WHEN SELECTED REGION HAS PRIORITY |
| 3 | CIRCLE 1307 | 4 | 4 | 8 | |
| 4 | TRIANGLE 1308 | 5 | 5 | 10 | |
| 5 | OUTSIDE OF ORIGINAL 1310 | 2 | 1 | 3 | DETERMINED TO BE BACKGROUND COLOR WHEN ENTIRE REGION HAS PRIORITY |

| # | BACKGROUND-COLOR CANDIDATES | SELECTED REGION | | | ENTIRE REGION | | | | INTEGRATION OF SCORES | | INTEGRATION OF WEIGHTED SCORES | |
|---|---|---|---|---|---|---|---|---|---|---|---|---|
| | | PROPORTION RATIO | SCORE | WEIGHTED SCORE | PROPORTION RATIO | SCORE | WEIGHTED SCORE | TOTAL SCORE | RESULTS | TOTAL WEIGHTED SCORE | RESULTS |
| 1 | SQUARE 306 | 35% | 1 | 0.65 | 18% | 3 | 2.46 | 4 | | 3.11 | |
| 2 | BACKGROUND COLOR 305 | 30% | 2 | 1.40 | 30% | 2 | 1.40 | 4 | A PLURALITY OF REGIONS HAVING THE SAME SCORE EXISTS. | 2.80 | DETERMINED TO BE BACKGROUND COLOR |
| 3 | CIRCLE 307 | 25% | 3 | 2.25 | 13% | 4 | 3.48 | 7 | | 5.73 | |
| 4 | TRIANGLE 308 | 10% | 4 | 3.60 | 5% | 5 | 4.75 | 9 | | 8.35 | |
| 5 | OUTSIDE OF ORIGINAL 310 | | | | 34% | 1 | 0.66 | — | | — | |

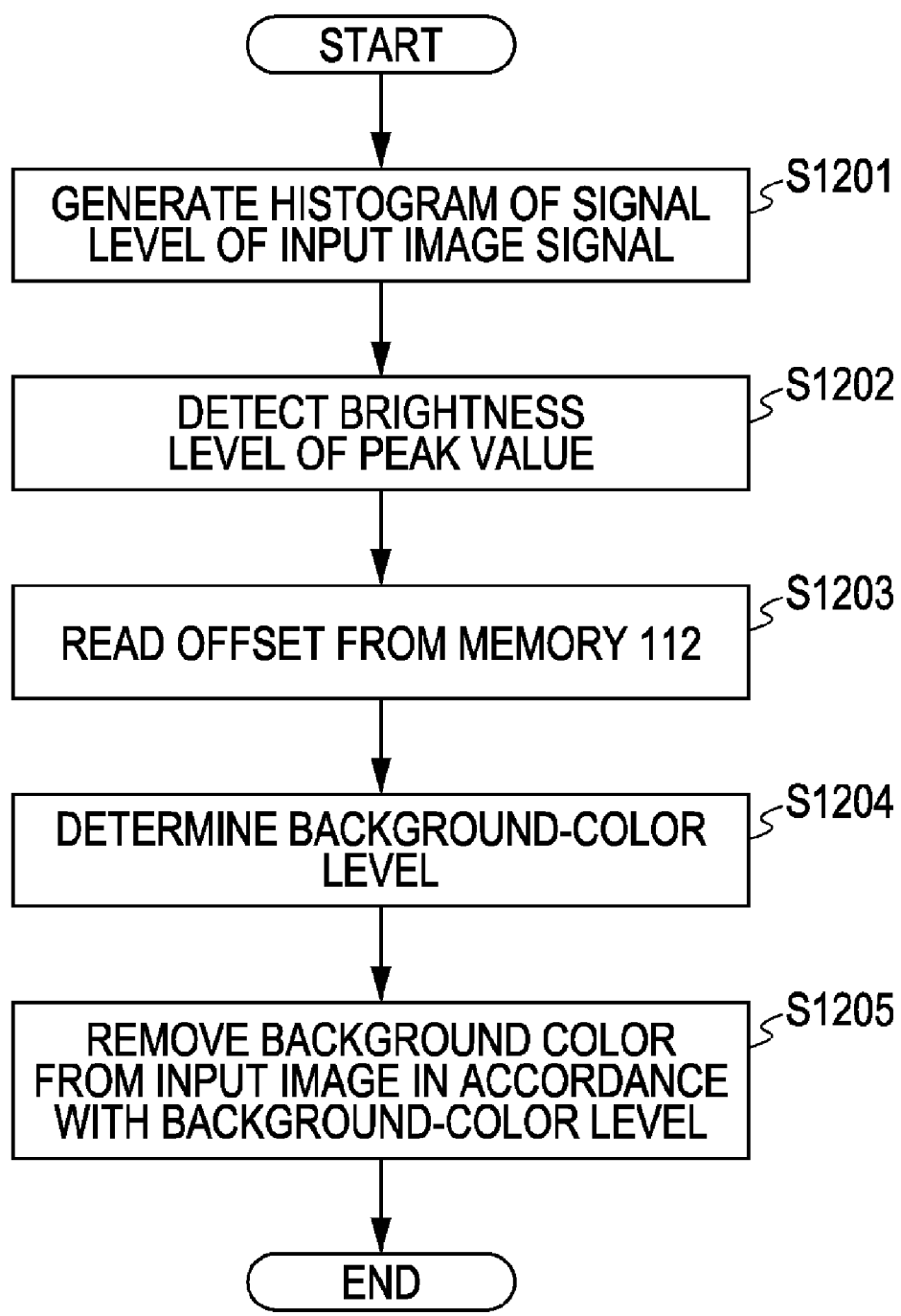

IMAGE PROCESSING APPARATUS AND METHOD, COMPUTER PROGRAM, AND STORAGE MEDIUM

BACKGROUND OF THE INVENTION

1. Field of the Invention

The present invention relates to image processing apparatus and methods that perform image processing for images, to computer programs, and to storage media.

2. Description of the Related Art

When a photocopy of an original is made using a copying machine or the like, the color of the paper of the original or the tint color of the background of the original, which is called the "background color", may be photocopied at the same time. The processing described below is available as image processing suitable for the background color contained in an original image. A brightness (or density) histogram of an image read with a scanner is generated, and the signal level of the background color (background) of the original image (hereinafter, referred to as the "background-color level") is detected in accordance with the generated histogram. Then, the background-color level is subtracted from an image signal to perform processing for removing the background color from the image (hereinafter, referred to as "removal of the background color").

A method for removing a background color when a photocopy of an original having the background color is made using a copying machine is suggested, for example, in Japanese Patent Laid-Open No. 11-150657.

When a scanner of a copying machine includes a sensor for detecting the size of an original, the region corresponding to the original is detected by the sensor, and an image of the detected region corresponding to the original is read. Then, a brightness (or density) histogram of the image of the region corresponding to the original is generated, and removal of the background color is performed.

In recent years, general-purpose scanners, personal computers (PCs), and printers have been widely used. Combining a scanner, a PC, and a printer can configure an image copying apparatus. However, since such a general-purpose scanner does not include a sensor for detecting the size of an original, an image including a region outside the original, the region being the largest region readable with the scanner, is input in image input processing. Accordingly, image processing, such as removal of a background color, is performed on the image including the region outside the original. Alternatively, the background color is removed by designating the region corresponding to the original on a PC, by generating a brightness (or density) histogram for the designated region corresponding to the original, and by detecting a background-color level in accordance with the histogram. A method for removing a background color when the region corresponding to an original cannot be detected in advance is suggested, for example, in Japanese Patent Laid-Open No. 2004-349858.

In addition, a method for selecting the region corresponding to a part of an original and for making a photocopy of the selected region is available. When a photocopy of the selected region is made, if the region corresponding to the original has been determined, a background-color level can be detected in accordance with the density of the region corresponding to the entire original. However, if the region corresponding to the original has not been determined, the background-color level is detected in accordance with the density of the selected region to remove the background color.

However, in the method for detecting the background-color level in accordance with the density of the selected region, if the selected region does not contain a large amount of background color, a histogram generated using a density (brightness) signal of the selected region does not include a large amount of color that should be detected as the background color. Thus, the background-color level cannot be detected accurately. None of Japanese Patent Laid-Open Nos. 11-150657 and 2004-349858 disclose a method for appropriately detecting the background-color level of the selected region when part of an original is selected and the selected region does not include a large amount of background color.

SUMMARY OF THE INVENTION

The present invention detects a background color contained in a selected region with high accuracy even when the region corresponding to an original has not been determined, part of a read region is selected, and the selected region does not contain a large amount of background color.

An image processing method according to an aspect of the present invention includes an inputting step of inputting an image signal of a region read by an image reader; a region-selecting step of selecting a part of the read region; a first calculating step of calculating a frequency distribution of the image signal of the read region input by the inputting step; a second calculating step of calculating a frequency distribution of the image signal of the selected region selected by the region-selecting step; a detecting step of detecting a background-color region in accordance with the frequency distribution of the image signal of the read region calculated by the first calculating step and the frequency distribution of the image signal of the selected region calculated by the second calculating step; and a background-color-removing step of removing a background color contained in the selected region in accordance with the level of an image signal of the background-color region detected by the detecting step.

Accordingly, even if the region corresponding to an original has not been determined, a part of a read region is selected, and the selected region does not contain a large amount of background color, the background color contained in the selected region can be detected with high accuracy.

The present invention provides a new function. Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a table showing proportion ratios and scores of background-color candidates in the entire region.

FIG. 16 is a table to which scores in the selected region and the entire region are added.

FIG. 17 is a table to which scores in the selected region and the entire region are added for an original shown in FIG. 23.

FIG. 18 is a table showing scoring results when a region outside the original is included in the selected region.

FIG. 19 is a table to which proportion ratios and weighted scores for the selected region and the entire region and total weighted scores are added to the table shown in FIG. 17.

FIG. 20 is a flowchart for explaining a process to remove the background color by detecting the background-color level.

DESCRIPTION OF THE EMBODIMENTS

Embodiments of the present invention will be described with reference to the drawings.

First Embodiment

Figure 1:
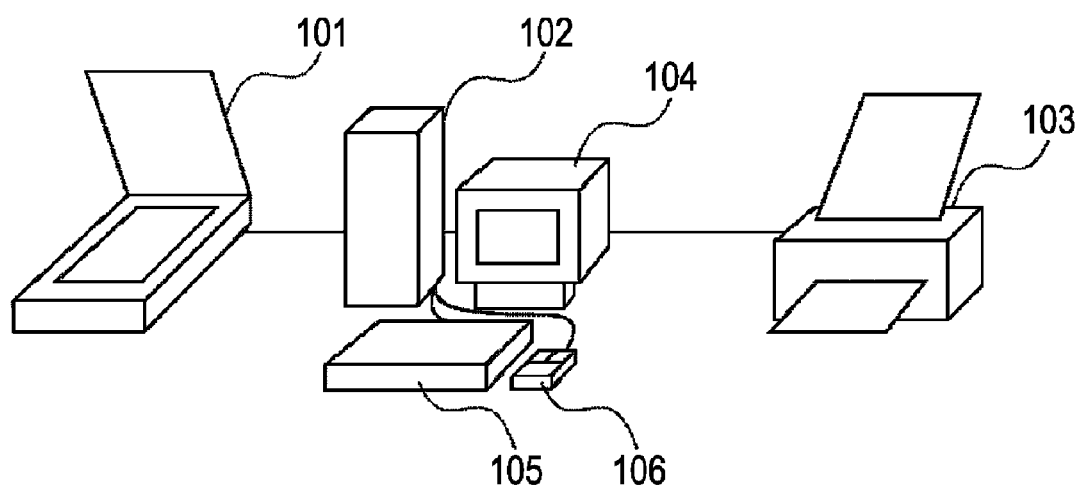
FIG. 1 shows a configuration of an image processing system according to an embodiment of the present invention.

FIG. 1 shows a configuration of an image processing system according to a first embodiment. The image processing system according to the first embodiment includes an image input apparatus 101, such as a scanner, an image processing apparatus 102, such as a PC, an image output apparatus 103, such as a printer, a monitor 104, a keyboard 105, and a mouse 106. In the first embodiment, a scanner that does not include a sensor for detecting the region corresponding to an original is used as the image input apparatus 101. In addition, a PC that is provided with the monitor 104, the keyboard 105, and the mouse 106 is used as the image processing apparatus 102. Furthermore, a printer is used as the image output apparatus 103.

Figure 2:
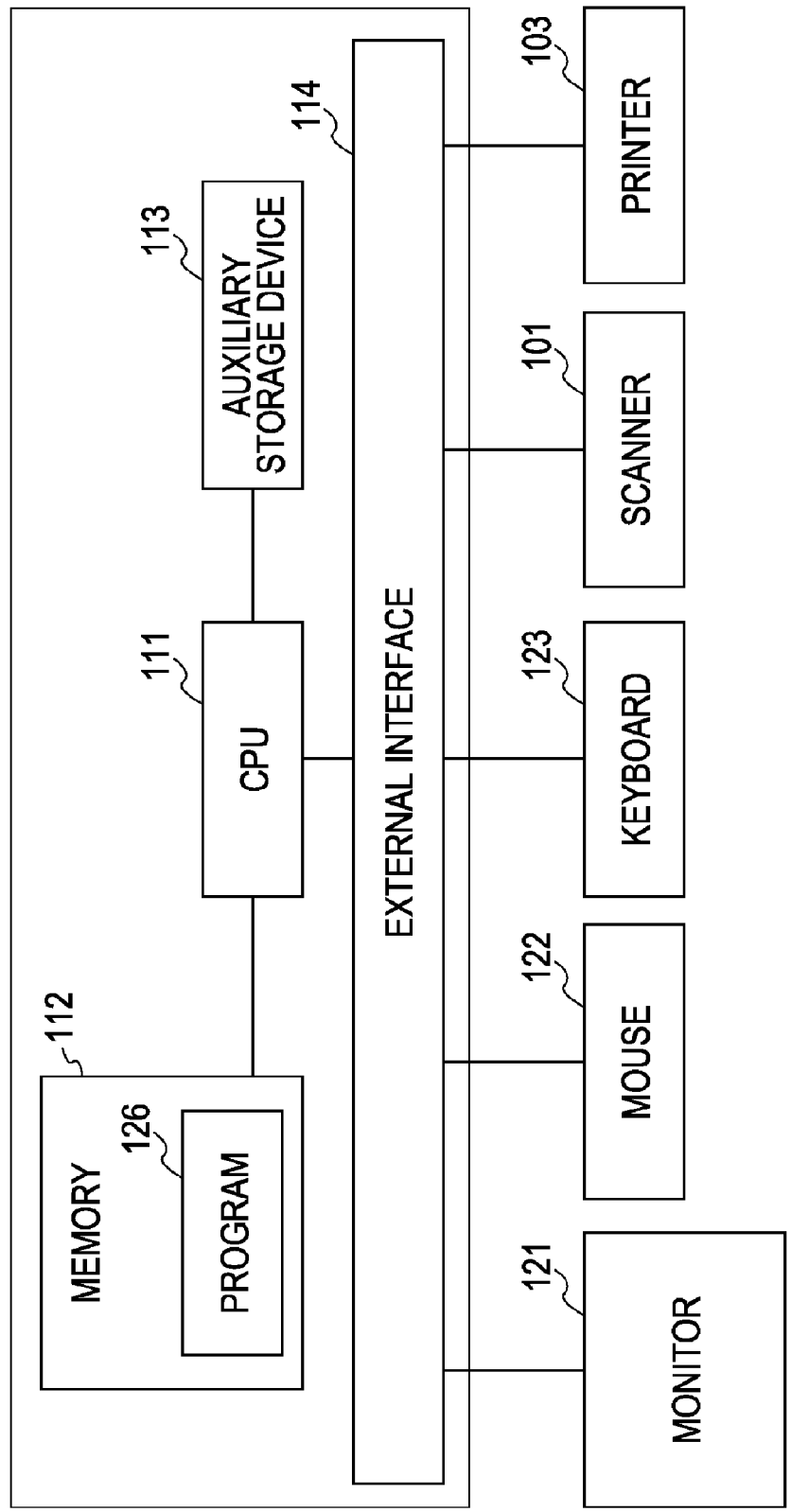
FIG. 2 is a block diagram of an image processing apparatus.

FIG. 2 is a block diagram of the image processing apparatus 102. The image processing apparatus 102 includes a central processing unit (CPU) 111, a memory (read-only memory (ROM)) 112 connected to the CPU 111, an auxiliary storage device 113, and an external interface 114. A monitor 121 for displaying an image, a mouse 122, and a keyboard 123 are connected to the external interface 114. The mouse 122 and the keyboard 123 serve as command input devices. In addition, the image input apparatus (scanner) 101 and the image output apparatus (printer) 103 are connected to the external interface 114. An image processing program 126 is stored in the memory (ROM) 112. The CPU 111 executes the image processing program 126, and an operation screen for executing the image processing program 126 is displayed on the monitor 121, such as a cathode-ray tube (CRT).

The image processing according to the first embodiment is processing for removing the background color of an original.

Figure 3:
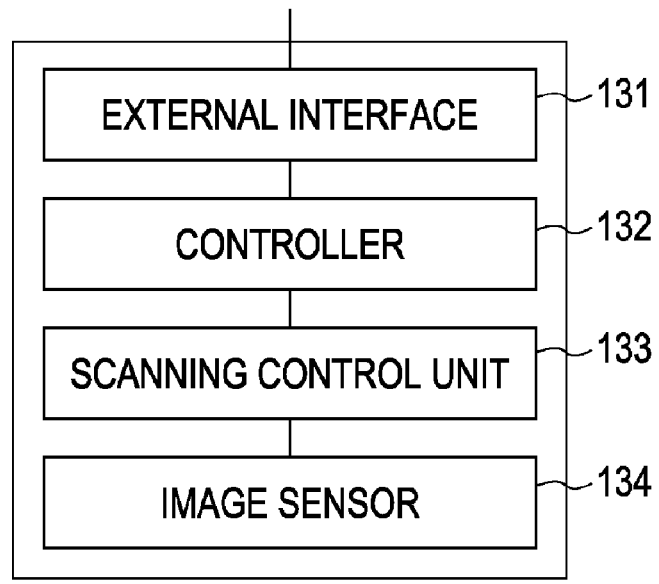
FIG. 3 is a block diagram of a scanner.

FIG. 3 is a block diagram of the image input apparatus (scanner) 101. The image input apparatus (scanner) 101 includes an external interface 131 to be connected to the image processing apparatus 102, a controller 132 that generally controls the entire scanner, a scanning control unit 133, and an image sensor 134 that reads the original. The image input apparatus (scanner) 101 is connected to the image processing apparatus 102 via the external interface 131.

Figure 4:
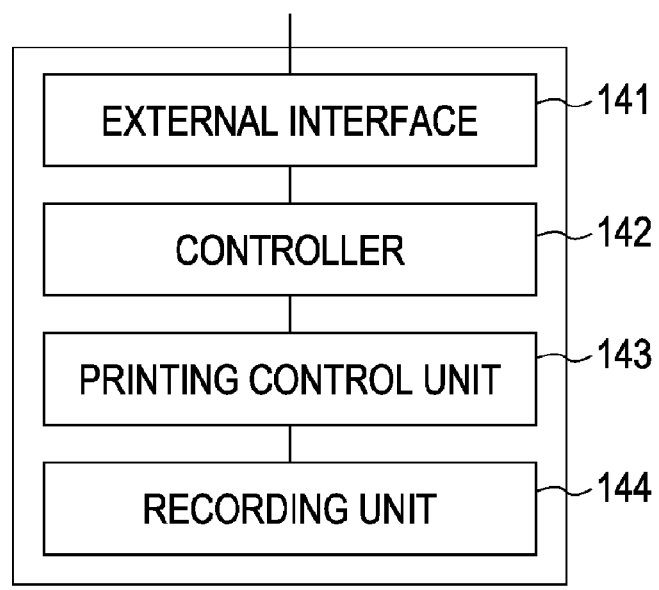
FIG. 4 is a block diagram of a printer.

FIG. 4 is a block diagram of the image output apparatus (printer) 103. The image output apparatus (printer) 103 includes an external interface 141 to be connected to the image processing apparatus 102, a controller 142 that generally controls the entire printer, a printing control unit 143, and a recording unit 144 that performs printing on paper. The image output apparatus (printer) 103 is connected to the image processing apparatus 102 via the external interface 141.

Figure 5:
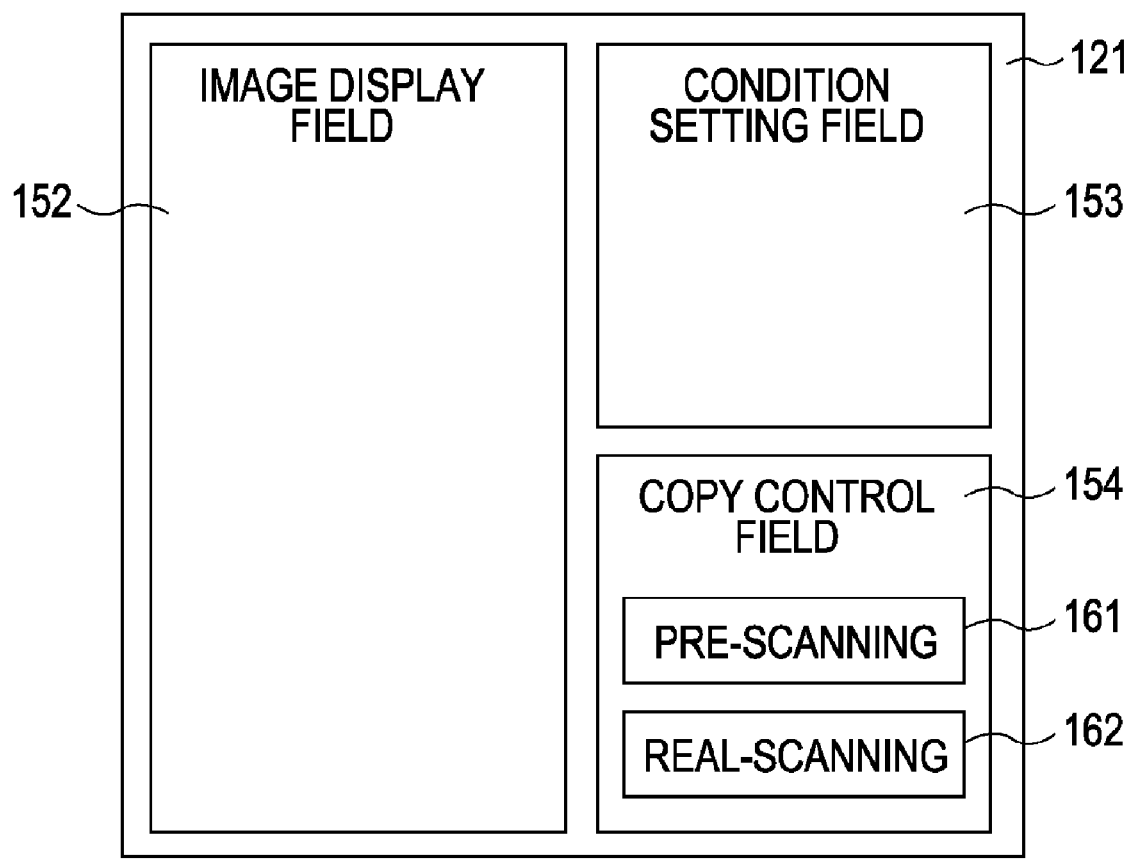
FIG. 5 shows an operation screen for executing an image processing program.

FIG. 5 shows an operation screen for executing the image processing program 126. On the monitor 121 that displays the operation screen for the image processing program 126, an image display field 152 for displaying a read image, a condition setting field 153 for setting conditions for image processing, and a copy control field 154 for controlling image copying processing are displayed. In addition, in the copy control field 154, a pre-scanning start button 161 for starting pre-scanning and a real-scanning start button 162 for starting real-scanning are displayed.

Figure 6:
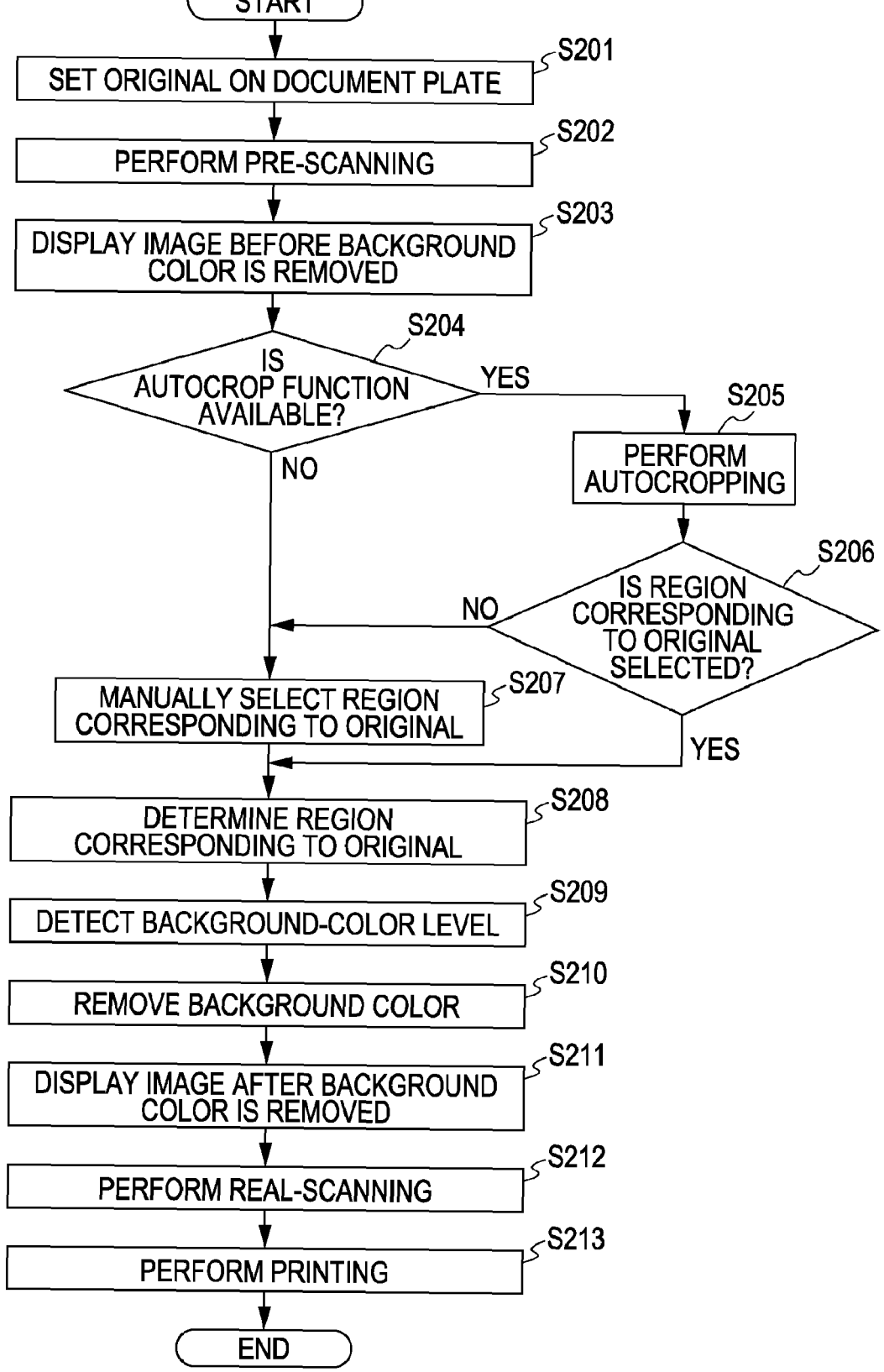
FIG. 6 is a flowchart of a process to remove a background color when the region corresponding to an original is detected automatically or manually.

Processing for Removing Background Color Performed when Region Corresponding to Original is Determined A process to remove the background color performed when the region corresponding to the original is determined automatically or manually will now be described with reference to FIG. 6. The image input apparatus (scanner) 101 performs processing of steps S201 to S202, steps S204 to S205, and step S212. The image processing apparatus 102 performs processing of step S203 and steps S206 to S211. The image output apparatus (printer) 103 performs processing of step S213.

In step S201, the original is set on a document plate of the image input apparatus (scanner) 101. In step S202, the pre-scanning start button 161 is pressed, and pre-scanning is performed. In the pre-scanning, the entire image including a region outside the original placed on a stage is scanned. An image signal (brightness signal) of the entire region read by the pre-scanning is input to the image processing apparatus 102 via the external interface 114.

In step S203, an image before the background color is removed is displayed on the monitor 121. In step S204, it is determined whether or not an autocrop function is available. The autocrop function is processing for determining the region corresponding to the original from the image including the region outside the original. If it is determined in step S204 that the autocrop function is available, the process proceeds to step S205 to perform autocropping. If it is determined in step S206 that the region corresponding to the original is selected, the process proceeds to step S208 to determine the region corresponding to the original. If it is determined in step S206 that the region corresponding to the original is not selected in accordance with the property of the original, the process proceeds to step S207 to manually select the region corresponding to the original.

If it is determined in step S204 that the autocrop function is not available, the process proceeds to step S207 to manually select the region corresponding to the original. In step S207, a user selects the region using the input device, such as the mouse 122, while checking an image including the region outside the original displayed in the image display field 152. After the region corresponding to the original is determined in step S208, the background-color level in the region corresponding to the original is detected in step S209 and the background color is removed in step S210. Then, in step S211, an image after the background color is removed is displayed on the monitor 121. In step S212, the real-scanning start button 162 is pressed, and real-scanning is performed. After the real-scanning is completed, the image is printed with the image output apparatus (printer) 103 in step S213.

The processing of step S209 for detecting the background-color level and the processing of step S210 for removing the background color will now be described.

As described in the related art, a brightness (or density) histogram for the region corresponding to the original read with the scanner is generated, and the background-color level of the original image is detected in accordance with the generated histogram. The background-color level is subtracted from an image signal of the read region corresponding to the original, and the background color is removed from the original image.

FIG. 20 is a flowchart of a process to remove the background color by detecting the background-color level of the region corresponding to the original. The process shown by the flowchart of FIG. 20 is realized when the CPU 111 of the image processing apparatus 102 executes the image processing program 126. A histogram of a brightness signal of an image signal input from the image input apparatus (scanner) 101 is generated (step S1201), and the brightness level of a peak value is detected in accordance with the generated histogram (step S1202). An offset adjusted and set in advance is read from the ROM 112 (step S1203), and the offset is subtracted from the detected brightness level of the peak value to determine the background-color level (step S1204). A brightness level equal to or higher than the determined background-color level is set to 255, and the background color contained in the image is removed (step S1205).

Figure 21:
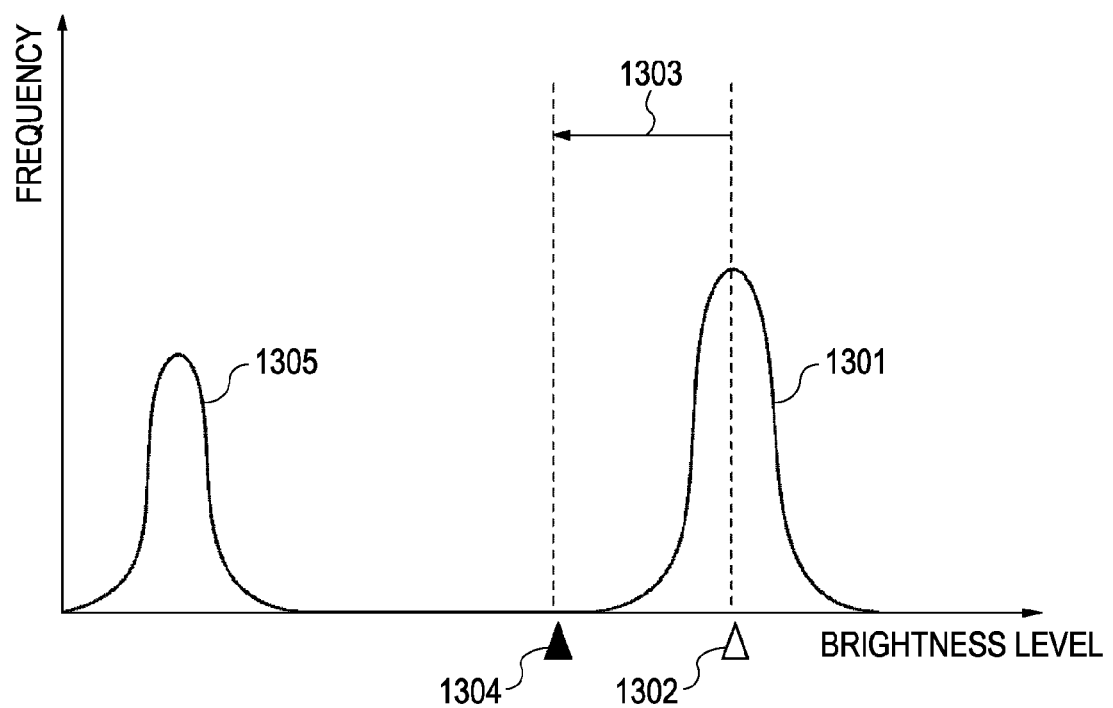
FIG. 21 is a histogram of an image signal obtained by scanning an original in which black letters are written on white paper.

FIG. 21 shows an example of a histogram of an image signal obtained by scanning an original in which black letters are written on general white paper. In FIG. 21, the horizontal axis represents a brightness level, and the vertical axis represents the frequency of occurrence for each brightness level.

The histogram shown in FIG. 21 has two peaks, that is, a letter portion 1305 (black) and a background-color portion 1301 (white). The letter portion 1305 is formed to have some dispersion in a low-brightness region. The background-color portion 1301 is formed to have some dispersion in a high-brightness region. An offset 1303 is subtracted from a brightness 1302 of a peak value (maximum frequency) of the background-color portion 1301, and a background-color level 1304 is acquired. A brightness level equal to or higher than the acquired background-color level 1304 is set to 255 (white), and the background color is removed from the image.

Method for Detecting Background-Color Level from Selected Region and Removing Background Color A method for selecting the region corresponding to a part of the original and making a photocopy of the selected region will now be described. When the photocopy of the selected region is made, if the region corresponding to the original has been determined, the background-color level can be detected in accordance with the density of the entire region corresponding to the original. However, if the region corresponding to the original has not been determined, the background-color level is detected from the brightness of the selected region, and the background color is removed.

Figure 7:
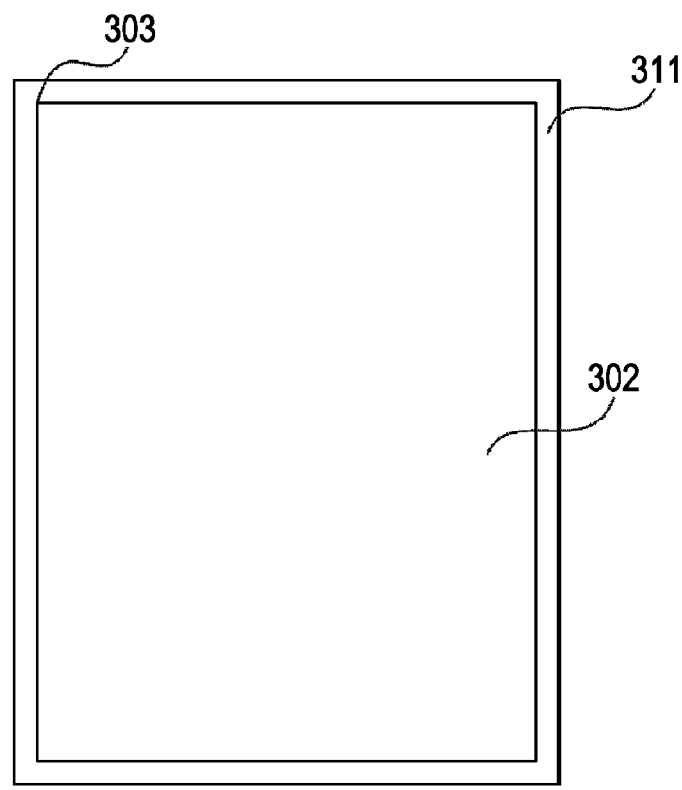
FIG. 7 shows a document plate of the scanner.

FIG. 7 shows a document plate 311 of the image input apparatus (scanner) 101. A stage 302 is provided inside the document plate 311. A portion of an original that is placed on the stage 302 is scanned with the image input apparatus (scanner) 101. In contrast, a portion of the original that is not placed on the stage 302 is not scanned with the image input apparatus (scanner) 101. The stage 302 includes a reference point 303 used for setting the position of the original. The user places the original on the document plate 311 such that a corner of the original fits the reference point 303.

Figure 8:
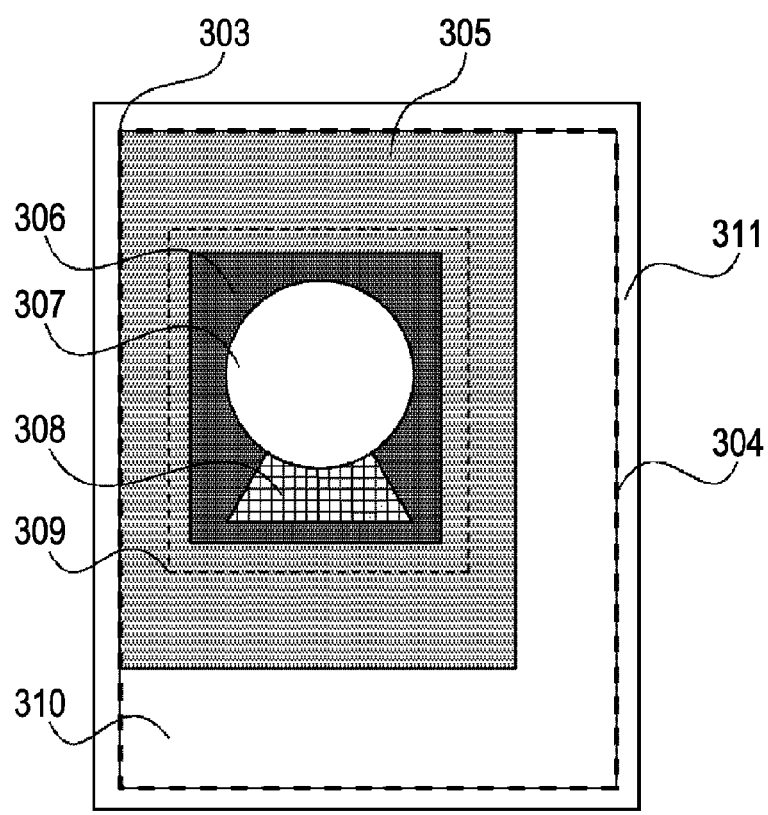
FIG. 8 shows a state in which the original is placed on a stage of the scanner.

FIG. 8 illustrates an original 305 placed on the stage 302. The size of the original 305 is smaller than the size of the stage 302. A picture 306 having a square shape is provided in a center portion of the original 305 placed on the stage 302. In addition, a picture 307 having a circular shape and a picture 308 having a triangular shape, which are overlapped with each other, are provided inside the picture 306. A selected region 309 is represented by a dotted line. A portion outside the original 305 on the stage 302 is a region 310 outside the original.

A method for detecting the background-color level in accordance with the brightness of the selected region and removing the background color when the region corresponding to the original has not been determined will now be described. In this case, the background-color level may be detected in accordance with the density of the selected region.

Figure 9:
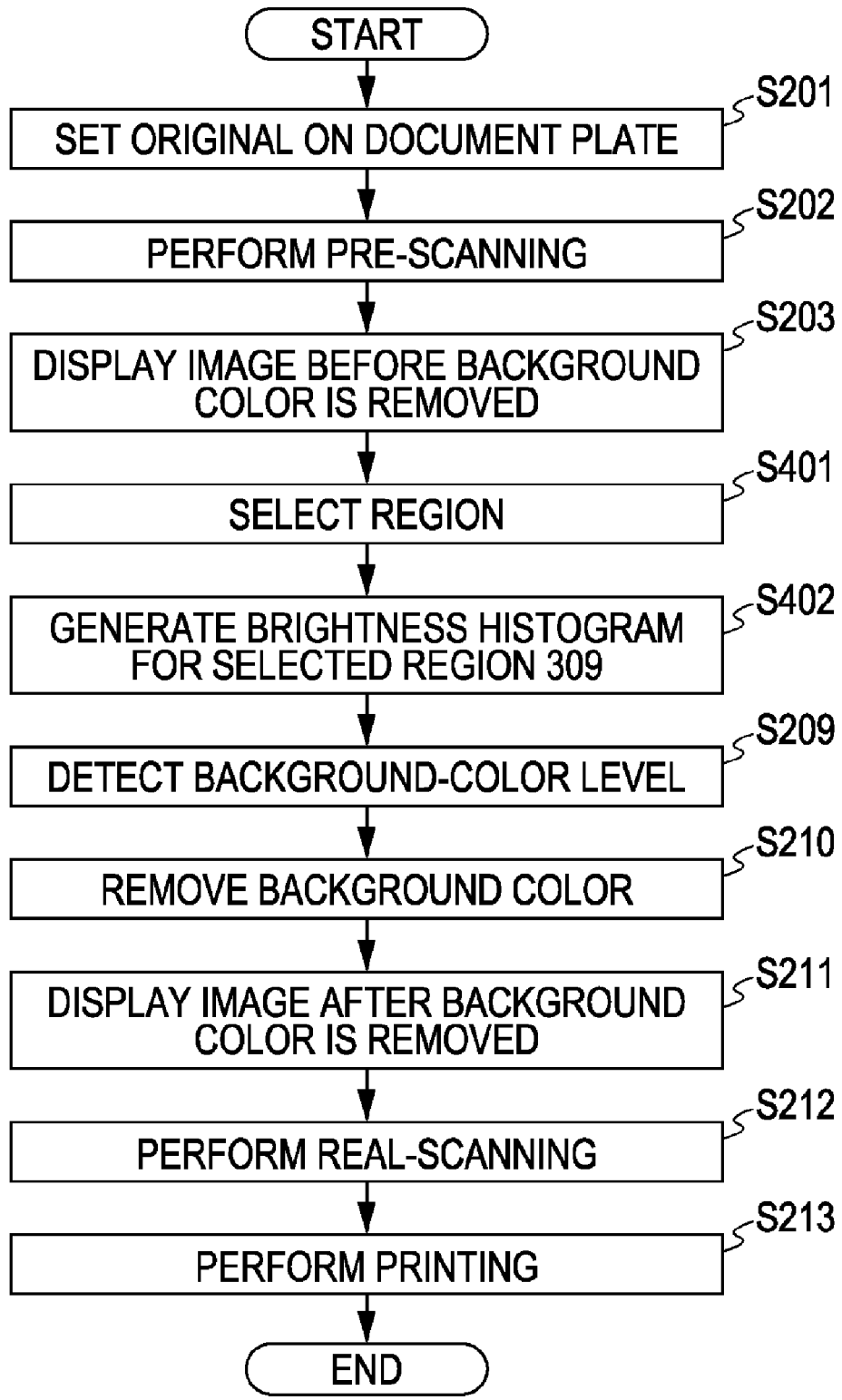
FIG. 9 is a flowchart for explaining a process to remove the background color by selecting a region and detecting the background color from the selected region.

FIG. 9 is a flowchart of a process to remove the background color by detecting the background-color level only from the selected region. In FIG. 9, the processing of steps S201 to S203 and steps S209 to S213 is similar to that shown in FIG. 6. Instead of the processing of steps S204 to S208 shown in FIG. 6, processing of steps S401 and S402 is performed. In step S401, a region to be photocopied is selected.

In step S402, a histogram of the brightness of the selected region 309 is generated. Then, in step S209, the peak in the histogram is calculated, and the background-color level is detected by subtracting the offset from the brightness level of the peak value. In step S210, the background color is removed.

Figure 10:
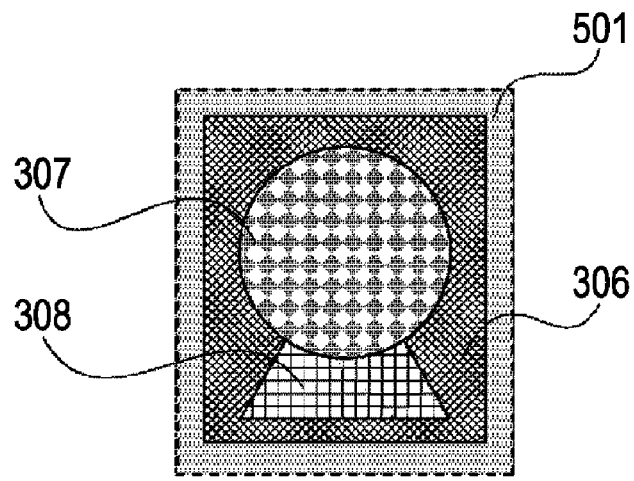
FIG. 10 shows a state before the background color is removed in the selected region.
Figure 11:
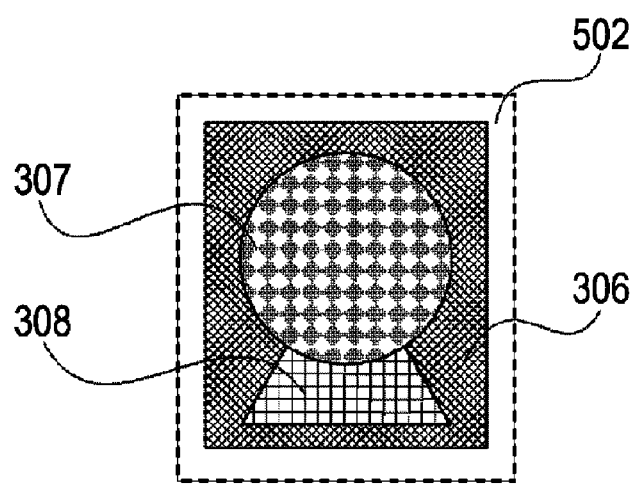
FIG. 11 shows a state after the expected background color is removed in the selected region.

FIG. 10 shows the selected region 309 before the background color is removed. The selected region 309 includes a background color 501 to be removed, the picture 306 having the square shape, the picture 307 having the circular shape, and the picture 308 having the triangular shape. FIG. 11 shows the selected region 309 after the expected background color is removed. A background color 502 is removed.

Figures 12, 13:
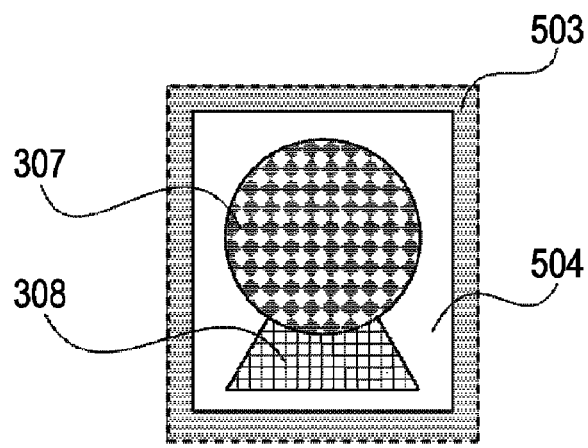
FIG. 12 shows a state in which a background color is falsely detected in the selected region.
FIG. 13 is a table showing proportion ratios and scores of background-color candidates in the selected region.

FIG. 12 shows the selected region 309 after the background color is removed by performing the process to remove the background color shown by the flowchart of FIG. 9. In FIG. 12, a background color 503 is not removed, and a picture 504 having a square shape is removed by mistake. This is because the picture 504 having the square shape is falsely detected since the area of the background color 503 within the selected region 309 is small.

FIG. 13 shows a proportion ratio of colors in the selected region 309 shown in FIG. 12. Since the picture 504 having the square shape has the largest proportion ratio 602, which is 35%, the picture 504 is falsely detected as the background color.

As described above, when the background-color level is detected only from the selected region, if the area of the background color in the select region is small, a portion that is not the background color is falsely detected as the background color, as shown in FIG. 12.

Figure 14:
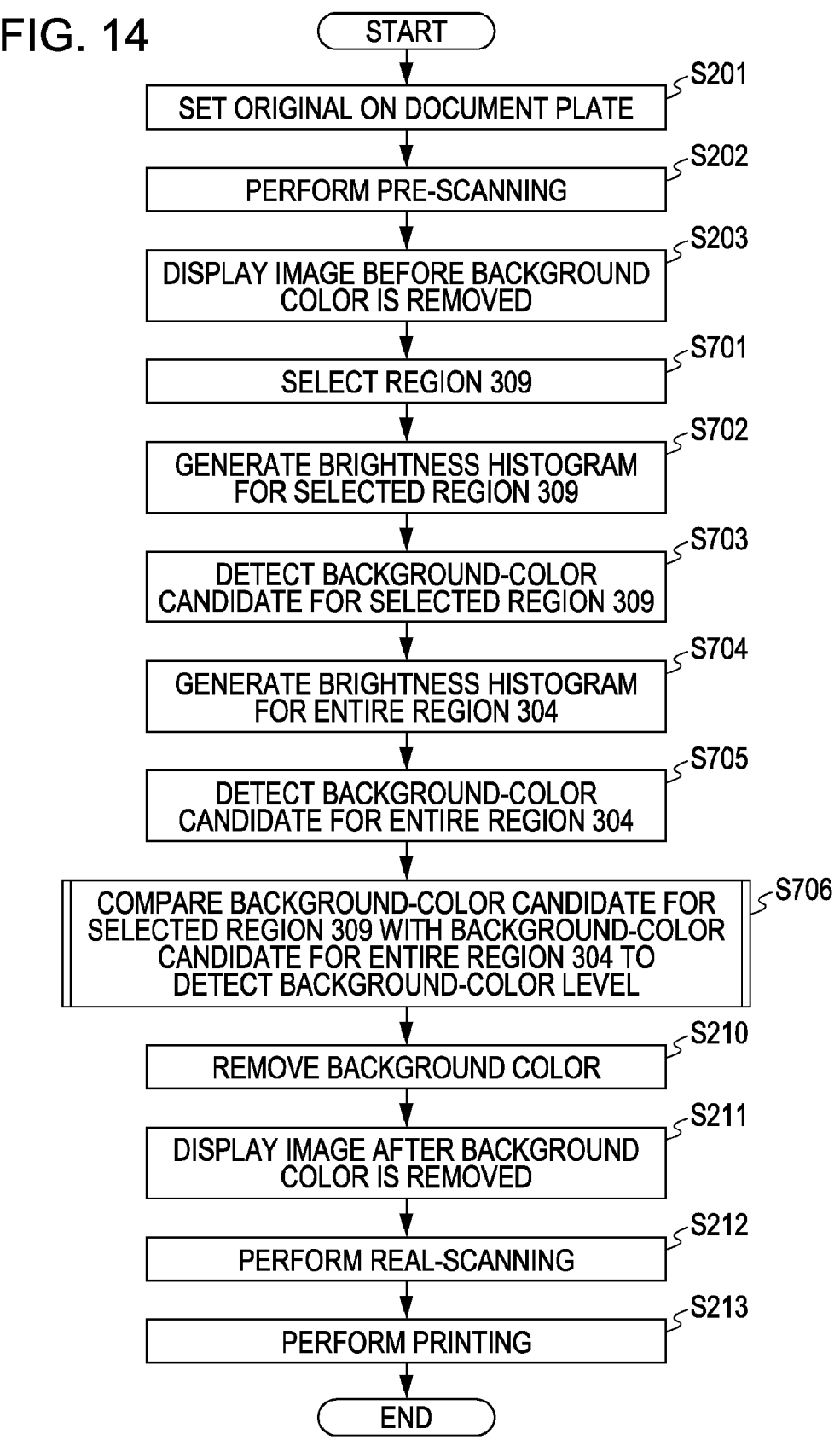
FIG. 14 is a flowchart for explaining a process to remove the background color in a first embodiment.

Method for Removing Background Color by Detecting Background-Color Level Both in Selected Region and Entire Read Region To address the above-described problem of false detection of the background color, in the first embodiment, the background color in the selected region is accurately detected by performing a process shown in FIG. 14.

FIG. 14 is a flowchart showing a process to remove the background color by detecting background-color candidates for each of the selected region 309 and the entire region 304 and by comparing the background-color candidates to detect the background-color level. In FIG. 14, processing of steps S201 to S203 and steps S210 to S213 are similar to that shown in FIG. 6. Instead of the processing of steps S204 to S209 shown in FIG. 6, processing of step S701 to S706 is performed. The processing of steps S701 to S706 shown in FIG. 14 is realized when the CPU 111 of the image processing apparatus 102 executes the image processing program 126. The entire region 304 corresponds to a region read by an image reader, such as the image input apparatus (scanner) 101 or the like, and includes a region outside the original. FIG. 8 shows the entire region 304.

In step S701, the selected region 309 is selected. In step S702, a histogram (frequency distribution) on the brightness of the selected region 309 is generated using the image signal (brightness signal) received from the image input apparatus (scanner) 101 via the external interface 114. In step S703, a background-color candidate for the selected region 309 is detected in accordance with the distribution in the histogram for the selected region 309 generated in step S702. In step S704, a histogram (frequency distribution) on the brightness of the entire region 304 is generated using the image signal (brightness signal) received from the image input apparatus (scanner) 101 via the external interface 114. In step S705, a background-color candidate for the entire region 304 is detected.

In each of the processing of steps S703 and S705 for detecting a background-color candidate for the corresponding region, the brightness region corresponding to the frequency peak is defined as a first background-color candidate in accordance with the distribution of the brightness in the corresponding histogram. The region with the second highest frequency is defined as a second background-color candidate. In this way, background-color candidates are sequentially detected.

In step S706, the background-color candidate for the selected region 309 detected in step S703 is compared with the background-color candidate for the entire region 304 detected in step S705 to detect the background-color level. In the first embodiment, after the background-color candidate for the selected region 309 is detected, the background-color candidate for the entire region 304 is detected. However, the background-color candidate for the entire region 304 may be detected before the background-color candidate for the selected region 309 is detected. Alternatively, processing for detecting the background-color candidate for the selected region 309 and processing for detecting the background-color candidate for the entire region 304 may be performed in parallel.

Figure 22:
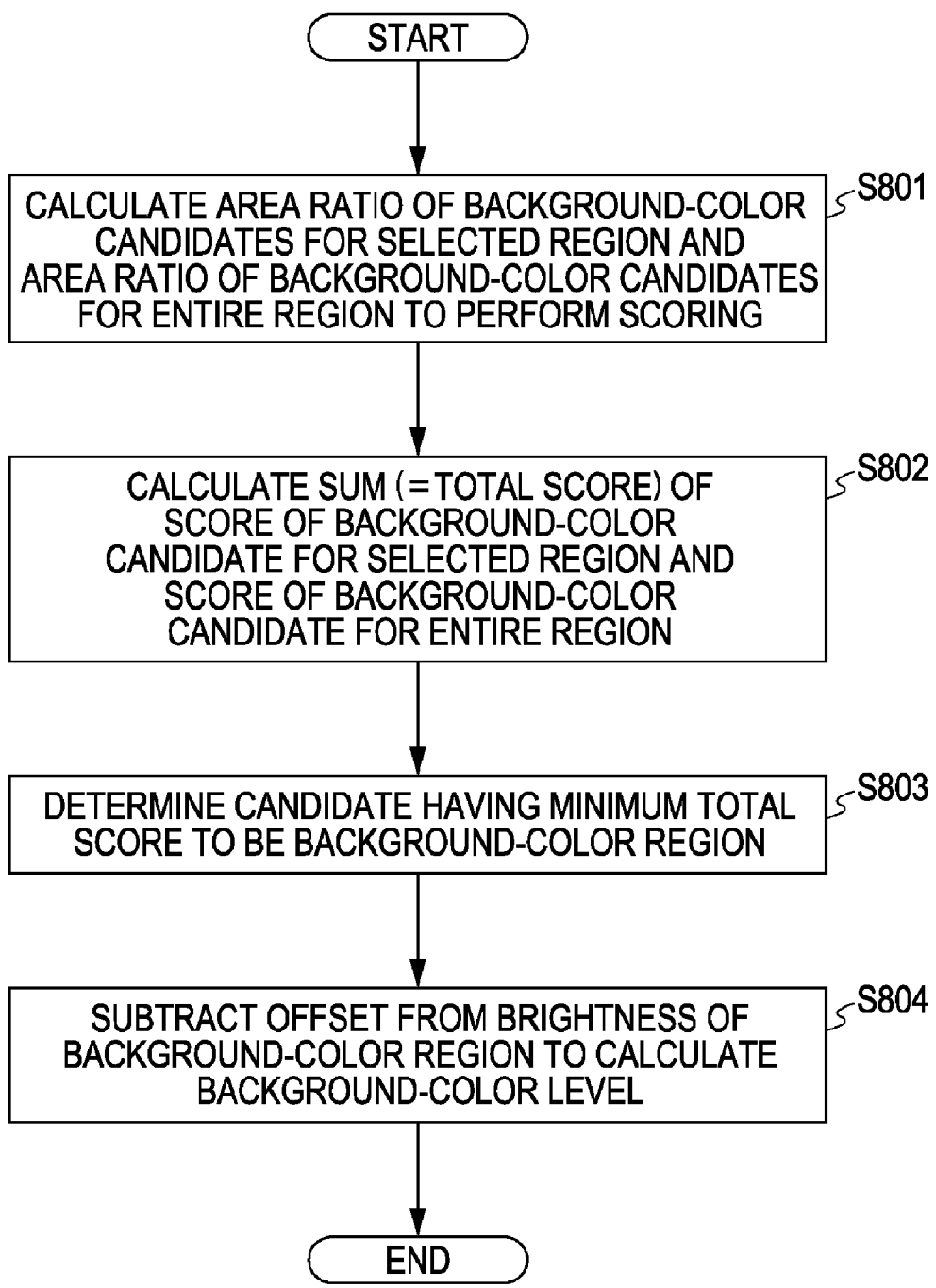
FIG. 22 is a flowchart for explaining the details of the processing of step S706 shown in FIG. 14.

FIG. 22 is a flowchart for explaining the processing of step S706 in more detail. The processing of step S706 is performed when the image processing program 126 stored in the ROM 112 shown in FIG. 2 is executed.

In step S801, the area ratio (proportion ratio) of each of the background-color candidates for the selected region 309 is calculated, and a score is given to each of the background-color candidates in an order from the background-color candidate having the largest area to the background-color candidate having the smallest area. For example, as shown in FIG. 13, the proportion ratio of the area of the picture (square) 504 to the area of the selected region 309 is maximum, such as 35%. Thus, the picture (square) 504 has a score of 1. In addition, in step S801, similarly, the area ratio (proportion ratio) of each of the background-color candidates for the entire region 304 is calculated, as shown in FIG. 15, and a score is given to each of the background-color candidates in the order from the background-color candidate having the largest area to the background-color candidate having the smallest area.

In step S802, the sum of a score 902 of each of the background-color candidates for the selected region 309 and a score 903 of each of the background-color candidates for the entire region 304 that are calculated in step S801 is calculated to obtain a total score 904 of the corresponding background-color candidate. In step S803, the background-color candidate having the minimum total score 904 is determined to be a background-color region. In step S804, an offset is subtracted from the brightness of the background-color region to obtain the background-color level.

FIG. 16 shows an example of scoring results for the selected region 309 and the entire region 304 with respect to the original shown in FIG. 8. In the selected region 309, the picture (square) 306 has the largest area, the background color (original) 305 has the second largest area, the picture (circle) 307 has the third largest area, and the picture (triangle) 308 has the smallest area. In the entire region 304, the background color (original) 305 has the largest area, the region 310 outside the original has the second largest area, the picture (square) 306 has the third largest area, the picture (circle) 307 has the fourth largest area, and the picture (triangle) 308 has the smallest area. Thus, the total score 904 of the picture (square) 306 is 4, the total score 904 of the background color (original) 305 is 3, the total score 904 of the picture (circle) 307 is 7, the total score of the picture (triangle) 308 is 9, and the region 310 outside the original has no total score since the region 310 does not exist within the selected region 309. Thus, the background color (original) 305 having the minimum total score 904 is determined to be the background-color region.

As described above, since scores are given to area ratios for the selected region and to area ratios of the entire region and determination of the background color is performed in accordance with total scores, even if a large amount of background color is not contained in the selected region, determination of the background color can be performed with high accuracy.

Figure 23:
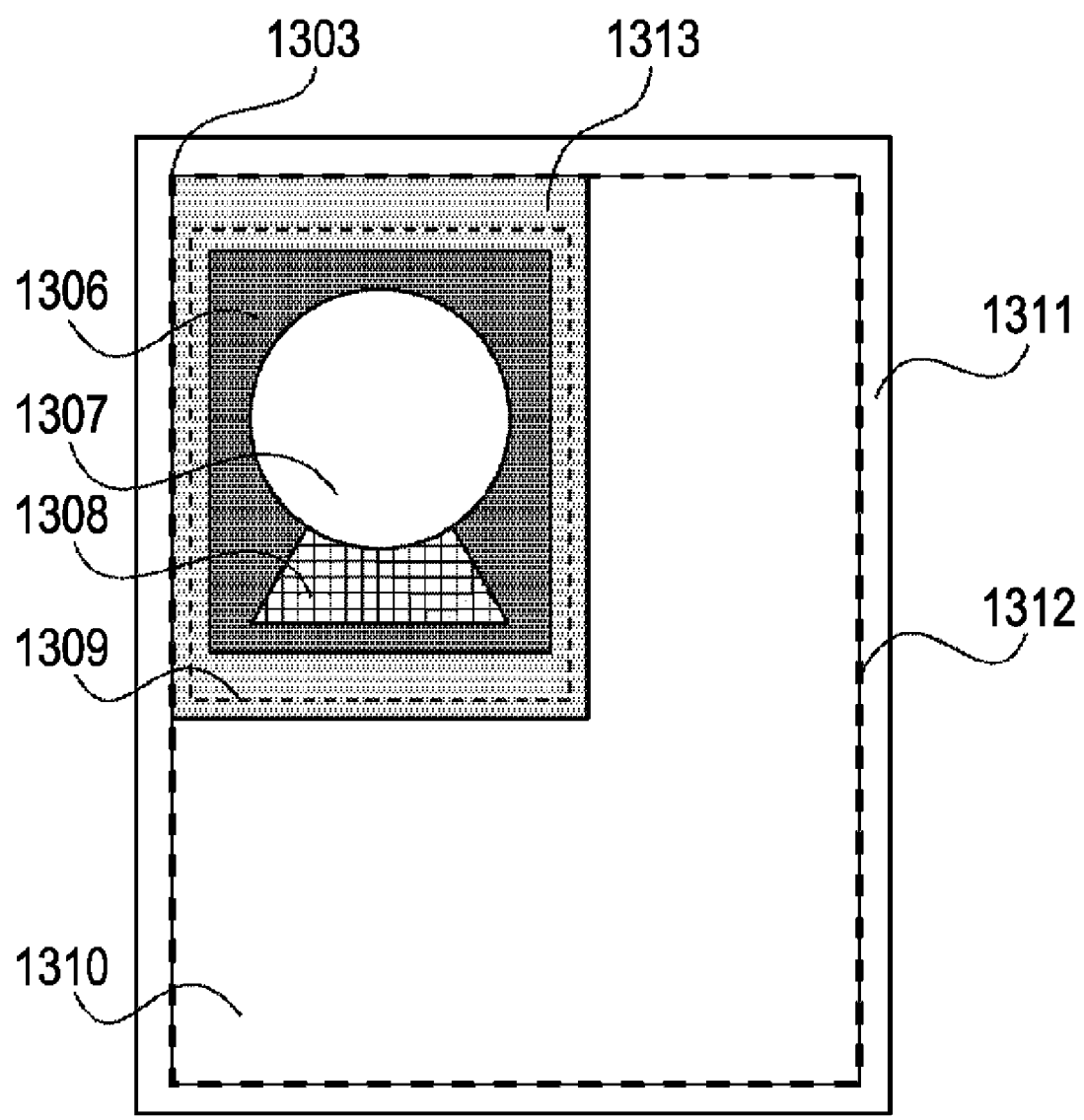
FIG. 23 shows a state in which a background-color region of the original is smaller than a region outside the original in the entire region.

Case where a Plurality of Background-Color Candidates having the Minimum Total Score Exists FIG. 17 shows an example of scoring results for a selected region 1309 and an entire region 1312 with respect to an original shown in FIG. 23. A background-color region 1313 of the original shown in FIG. 23 is smaller than a region 1310 outside the original in the entire region 1312. When total scores 1004 are calculated in accordance with the flowchart shown in FIG. 22, each of the total score 1004 of a picture (square) 1306 and the total score 1004 of the background-color region 1313 is 4, which is minimum, as shown in FIG. 17. When a plurality of regions having the minimum total score exists, a higher-order region in the selected region or a higher-order region in the entire region can be selected. When determination of the background color is made with priority on the selected region, the picture (square) 1306 is determined to be the background color. Thus, a wrong region is determined to be the background color. In contrast, when determination of the background color is made with priority on the entire region, the background-color region 1313 is determined to be the background-color region. Thus, the accurate background color is determined.

FIG. 18 shows an example of scoring results when the region 1310 outside the original is contained in the selected region 1309 of the original shown in FIG. 23. In this case, a plurality of regions having the minimum total score 1014 exists. However, this case differs from the case shown in FIG. 17. That is, when determination of the background color is made with priority on the selected region, the background-color region 1313 is accurately determined to be the background color. In contrast, when determination of the background color is made with priority on the entire region, the region 1310 outside the original is falsely determined to be the background color.

If a plurality of regions having the minimum total score exists, the plurality of regions having the minimum total score may be displayed on the monitor 121 of the image processing apparatus 102 so that the user is able to select a background-color region. Alternatively, setting of whether determination of the background color is performed with priority on the selected region or on the entire region may be performed in advance.

As described above, according to the first embodiment, even when the region corresponding to the original has not been determined, a part of the original is selected, and the selected region does not contain a large amount of background color, the background-color level of the selected region can be detected with high accuracy. In addition, even when a plurality of regions having the minimum total score exists, since the plurality of regions having the minimum total score is displayed on the monitor, the user is able to select a region. Thus, a false determination is considerably prevented.

Second Embodiment

In the first embodiment, the method for giving a score to each of background-color candidates in an order from the background-color candidate having the largest area to the background-color candidate having the smallest area for each of the selected region and the entire region, for calculating the sum of a score for the selected region and a corresponding score for the entire region, and for determining the background-color candidate having the minimum total score to be a background-color region has been described. In a second embodiment, in addition to the total score used in the first embodiment, a total weighted score is used for determining a background-color candidate. More specifically, weighting is performed in accordance with the area of a background-color candidate, the sum of the weighted score for the selected region and the weighted score for the entire region is calculated, and the background-color candidate having the minimum total score and the minimum total weighted score is determined to be a background-color region.

Figure 24:
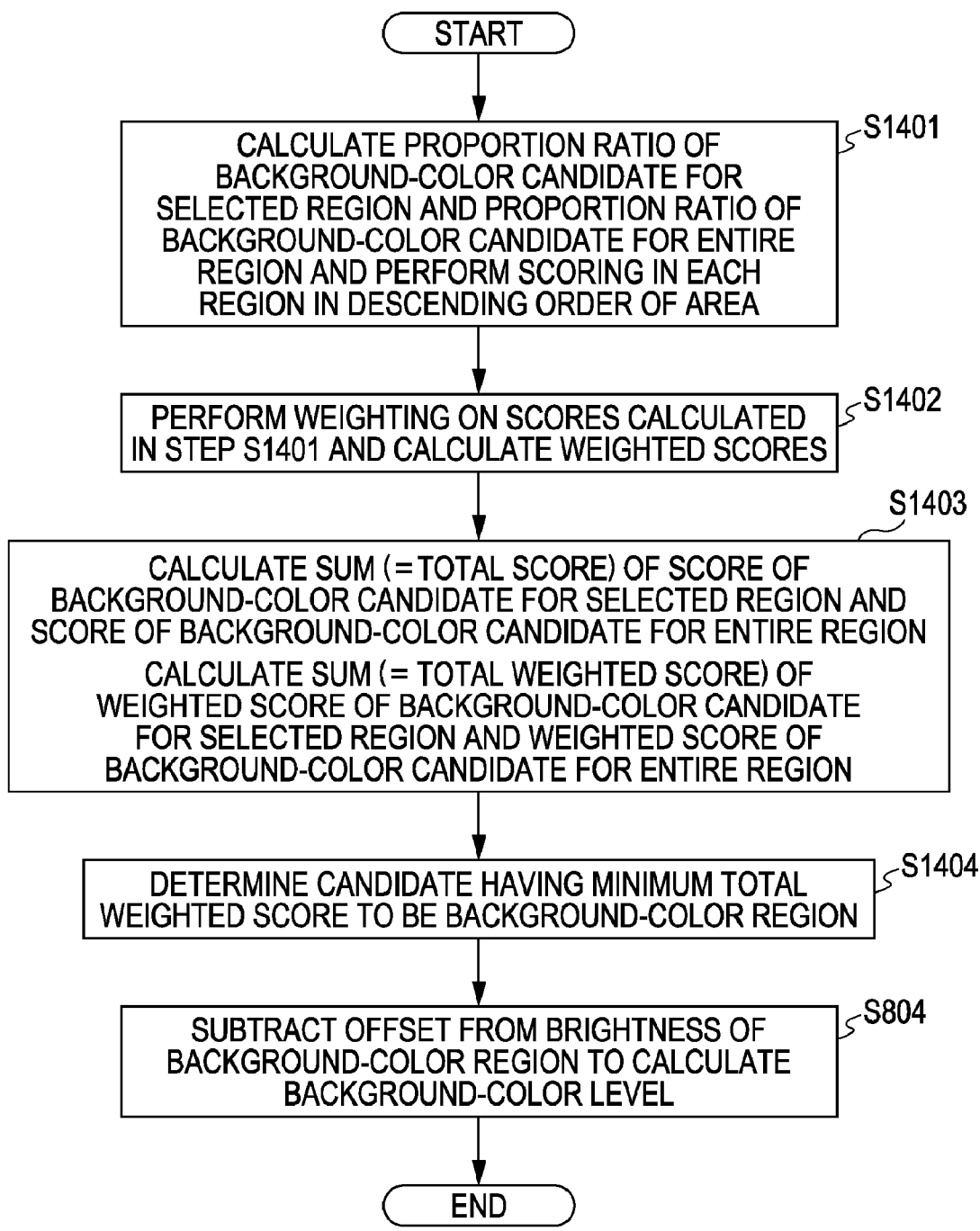
FIG. 24 is a flowchart of a process to remove the background color in a second embodiment.

In the second embodiment, processing of step S804 shown in FIG. 24 is the same as in the first embodiment. Instead of the processing of steps S801 to S803 shown in FIG. 22, processing of steps S1401 to S1404 shown in FIG. 24 is performed. The processing of steps S1401 to S1404 is realized by executing the image processing program 126 stored in the ROM 112 of the image processing apparatus 102 shown in FIG. 2.

The processing of steps S1401 to S1404 will now be described.

In step S1401, the proportion ratio of the area of a background-color candidate to the area of the selected region 309 and the proportion ratio of the area of a background-color candidate to the area of the entire region 304 are calculated, and a score is given to each of the background-color candidates from the background-color candidate having the largest area to the background-color candidate having the smallest area for each of the selected region 309 and the entire region 304. In step S1402, weighting is performed on the score of each of the background-color candidates in accordance with the corresponding proportion ratio for each of the entire region 304 and the selected region 309 to calculate a weighted score. A weighted score is calculated for each of the background-color candidates for each of the selected region 309 and the entire region 304.

FIG. 19 is a table in which proportion ratios and weighted scores for both the selected region and the entire region and total weighted scores are added to the table shown in FIG. 17. A weighted score 1104 for the selected region is calculated for each background-color candidate 1101 in accordance with a proportion ratio 1102 for the selected region and a score 1103 for the selected region. In addition, a weighted score 1107 for the entire region is calculated for each background-color candidate 1101 in accordance with a proportion ratio 1105 for the entire region and a score 1106 for the entire region.

An example of a computation expression for acquiring a weighted score will be explained.

Weighted Score $SW$=Score $S$ for Region×(1−Proportion Ratio (%)/100)

The above expression is merely an example. A weighted score may be calculated using other computation expressions.

In step S1403, the sum of the score 1103 of the background-color candidate for the selected region and the score 1106 of the background-color candidate for the entire region that are calculated in step S1401 is acquired, and a total score 1108 of the selected region and the entire region is acquired. Similarly, the sum of the weighted score 1104 of the background-color candidate for the selected region and the weighted score 1107 of the background-color candidate for the entire region that are calculated in step S1401 is acquired, and a total weighted score 1110 of the selected region and the entire region is acquired.

In step S1404, the background-color candidate having the minimum total weighted score 1110 is determined to be a background-color region. In step S804, the background-color level is acquired by subtracting the offset from the brightness of the background-color region. In step S1404, the background-color candidate having the minimum total score 1108 and the minimum total weighted score 1110 may be determined to be a background-color region.

In accordance with results 1109 of total scores shown in FIG. 19, each of the total score 1108 of the picture (square) 306 and the total score 1108 of the background color (original) 305 is 4, which is minimum. In accordance with results 1111 of total weighted scores, the total score of the background color (original) 305 is 2.80, which is minimum. Thus, the background color (original) 305, which has the minimum total score 1108 and the minimum total weighted score 1110, is determined to be a background-color region 1112.

If the background-color candidate having the minimum total score is different from the background-color candidate having the minimum total weighted score, the background-color candidate having the minimum total weighted score can be determined to be a background color. Alternatively, if priority is given to a total score in advance, a background-color candidate having the minimum total score may be determined to be a background color.

As described above, according to the second embodiment, since a total weighted score is used for detecting a background-color region, a background color can be detected in accordance with the area ratio of a background-color candidate. Thus, a background-color level can be detected with higher accuracy.

Modifications

In the first embodiment and the second embodiment, a histogram is generated using a signal on a brightness received from the image input apparatus (scanner) 101 to detect the background-color level. However, the background-color level may be detected using a histogram on a density. In this case, by setting the density of a region having a density lower than that of a background-color region to 0 (that is, white), the background color can be removed.

Other Embodiments

As described above, an embodiment of the present invention may be applied to a system including a plurality of apparatus (for example, a host computer, an interface apparatus, a reader, a printer, and the like) or an apparatus formed by a single device (for example, a copying machine or a facsimile machine).

In addition, program code of software for realizing the functions of the foregoing embodiments may be supplied to a computer within an apparatus connected to various devices or a system. An embodiment of the present invention is also attained by operating the various devices in accordance with a program stored in the computer (a CPU or a microprocessing unit (MPU)) of the system or the apparatus.

In this case, the program code itself of the software attains the functions of the foregoing embodiments. Thus, the program code itself and a unit for supplying the program code to the computer, such as a storage medium storing the program code, constitutes the present invention.

The storage medium that stores the program code may be, for example, a floppy disk, a hard disk, an optical disk, a magneto-optical disk, a compact disc read-only memory (CD-ROM), a magnetic tape, a nonvolatile memory card, a ROM, or the like.

In addition, the functions of the foregoing embodiments can be attained not only by executing the supplied program code by the computer, but by an operating system (OS) in which the program code is running on the computer is also included in the present invention. Alternatively, the program code is also included in the present invention when the functions of the foregoing embodiments are attained in association with other software applications or the like.

In addition, the supplied program code may be stored in a memory provided in a function expansion board of the computer or a function expansion unit connected to the computer. The functions of the foregoing embodiments can also be attained by performing part or all of the actual processing by the CPU or the like arranged in the function expansion board or the function expansion unit on the basis of instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-046887 filed Feb. 23, 2006, which is hereby incorporated by reference herein in its entirety.

What is claimed is:

1. An image processing method in an image processing apparatus that performs image processing of images read by an image reader, the method comprising:

an inputting step of inputting into the image processing apparatus an image signal corresponding to an entire image read by the image reader;

a region-selecting step of selecting a region of the entire image read by the image reader;

a first detecting step of detecting a first plurality of background-color candidates included in the entire image read by the image reader, based on a frequency distribution of the image signal corresponding to the entire image read by the image reader and input by the inputting step;

a first calculating step of calculating a first area ratio of the first plurality of background-color candidates detected by the first detecting step;

a second detecting step of detecting a second plurality of background-color candidates included in the selected region, based on a frequency distribution of an image signal corresponding to the selected region selected by the region-selecting step;

a second calculating step of calculating a second area ratio of the second plurality of background-color candidates detected by the second detecting step;

a third detecting step of detecting a background-color region in accordance with a first score obtained by scoring the first area ratio of the first plurality of background-color candidates included in the entire image and a second score obtained by scoring the second area ratio of the second plurality of background-color candidates included in the selected region; and a background-color-removing step of removing a background color contained in the selected region in accordance with a level of an image signal of the background-color region detected by the third detecting step.

2. An image processing method according to claim 1, wherein the third detecting step further includes:

a first counting step of giving a first score to each of the plurality of background-color candidates in an order from the background-color candidate having the largest area to the background-color candidate having the smallest area within the entire image read by the image reader in accordance with a first proportion ratio, and a second counting step of giving a second score to each of the plurality of background-color candidates in an order from the background-color candidate having the largest area to the background-color candidate having the smallest area within the selected region in accordance with a second proportion ratio, and wherein the background-color region is detected from among the plurality of background-color candidates in accordance with a sum of the first score and the second score of each of the plurality of background-color candidates.

3. An image processing method according to claim 2, wherein the background-color region corresponds to one of the plurality of background-color candidates having the lowest sum.

4. An image processing method according to claim 2,
wherein a read-region priority mode and a selected-region priority mode are provided,
wherein the third detecting step further includes a selecting step of selecting the read-region priority mode or the selected-region priority mode, and
wherein when a plurality of background-color candidates have an identical sum of the first score and the second score, the background-color region is detected in accordance with the mode selected by the selecting step.

5. An image processing method according to claim 4, wherein when the read-region priority mode is selected in the selecting step and a plurality of background-color candidates have an identical sum of the first score and the second score, a region corresponding to the background-color candidate, of the plurality of background-color candidates, having the largest area in the entire image read by the image detector is selected as the background-color region.

6. An image processing method according to claim 4, wherein when the selected-region priority mode is selected in the selecting step and a plurality of background-color candidates have an identical sum of the first score and the second score, a region corresponding to the background-color candidate, of the plurality of background-color candidates, having the largest area in the selected region is detected as the background-color region.

7. An image processing method according to claim 1, wherein the third detecting step further includes:
a first counting step of giving a first score to each of the plurality of background-color candidates in an order from the background-color candidate having the largest area to the background-color candidate having the smallest area within the entire image in accordance with a first proportion ratio,
a second counting step of giving a second score to each of the plurality of background-color candidates in an order from the background-color candidate having the largest area to the background-color candidate having the smallest area within the selected region in accordance with a second proportion ratio,
a first weighted-score-calculating step of calculating a first weighted score of each of the plurality of background-color candidates in accordance with the first proportion ratio and the first score, and
a second weighted-score-calculating step of calculating a second weighted score of each of the plurality of background-color candidates in accordance with the second proportion ratio and the second score, and
wherein the background-color region is detected from among the plurality of background-color candidates in accordance with a sum of the first weighted score and the second weighted score of each of the plurality of background-color candidates.

8. An image processing method according to claim 7, wherein the background-color region corresponds to one of the plurality of background-color candidates having the lowest sum.

9. An image processing apparatus that performs image processing of images read by an image reader, comprising:
an inputting unit that inputs an image signal corresponding to an entire image read by the image reader;
a region selector that selects a region of the entire image read by the image reader;
a first detector unit that detects a first plurality of background-color candidates included in the entire image read by the image reader, based on a frequency distribution of the image signal corresponding to the entire image read by the image reader and input by the inputting unit;
a first calculator unit that calculates a first area ratio of the first plurality of background-color candidates detected by the first detector unit;
a second detector unit that detects a second plurality of background-color candidates included in the selected region, based on a frequency distribution of an image signal corresponding to the selected region selected by the region selector;
a second calculator unit that calculates a second area ratio of the second plurality of background-color candidates detected by the second detector unit;
a third detector unit that detects a background-color region in accordance with a first score obtained by scoring the first area ratio of the first plurality of background-color candidates included in the entire image and a second score obtained by scoring the second area ratio of the second plurality of background-color candidates included in the selected region; and
a background-color remover that removes a background color contained in the selected region in accordance with a level of an image signal of the background-color region detected by the third detector unit.

10. A non-transitory computer-readable storage medium having stored thereon a computer program for causing a computer to perform the image processing method set forth in claim 1.

* * * * *